United States Patent [19]

von der Heide et al.

[11] 4,151,447
[45] Apr. 24, 1979

[54] LINEAR MOTOR

[75] Inventors: Johann von der Heide, Mönchweiler; Georg F. Papst, St. Georgen both of Fed. Rep. of Germany

[73] Assignee: Papst-Motoren KG, St. Georgen, Fed. Rep. of Germany

[21] Appl. No.: 855,282

[22] Filed: Nov. 28, 1977

[30] Foreign Application Priority Data

Nov. 29, 1976 [DE] Fed. Rep. of Germany ....... 2654075

[51] Int. Cl.² ............................................. H02K 41/02
[52] U.S. Cl. ..................................... 318/135; 310/12; 104/148 LM
[58] Field of Search .................... 104/148 LM, 148 R; 310/12-14; 318/121, 135, 37, 38

[56] References Cited

U.S. PATENT DOCUMENTS

| 3,225,228 | 12/1965 | Koshala | 310/12 |
|---|---|---|---|
| 3,575,650 | 4/1971 | Fengler | 310/12 X |
| 3,594,622 | 7/1971 | Iuagaki | 318/135 |
| 3,707,924 | 1/1973 | Barthalon et al. | 104/148 LM |
| 3,771,033 | 11/1973 | Matsui et al. | 318/135 |
| 3,771,035 | 11/1973 | Cless | 318/135 |
| 4,012,676 | 3/1977 | Giebler | 318/135 |

*Primary Examiner*—Donovan F. Duggan
*Attorney, Agent, or Firm*—Michael J. Striker

[57] ABSTRACT

The stator comprises a ferromagnetic structure including a pair of spaced parallel ferromagnetic bars. A row of magnets extends along the length of the bars, at the inner side of one of the bars. The individual magnets of the row are magnetized in a direction transverse to the elongation of the bars. The successive magnets of the row are of alternate polarity. An armature is mounted for travel along the length of the two bars and includes a plurality of coils spaced one from the next in the direction of elongation of the bars and oriented to cut through the magnetic field lines of the magnets of the row of magnets in the space intermediate the two bars. The armature coils are energized periodically and in a cyclical sequence causing the armature to travel along the length of the two bars.

20 Claims, 5 Drawing Figures

LINEAR MOTOR

BACKGROUND OF THE INVENTION

The present invention relates to linear motors of the type comprised of two parallel ferromagnetic bars connected to a magnetic system, with a coil arrangement being mounted for movement along the lengths of the two bars, the coil arrangement being energized by current and cutting through the magnetic field lines emanating from the bars. Such linear motors are, for example, employed as drive mechanisms for peripheral equipment in data processing applications.

One linear motor of this type (disclosed in Federal Republic of Germany published patent application DT-OS No. 2,309,750) includes a magnet provided at at least one end of the two ferromagnetic bars. This magnet establishes a magnetic field of well-defined orientation between the bars. An energized coil is guided for longitudinal movement along the space intermediate the two bars. With this known construction, a considerable amount of electrical drive energy is wasted for each unit of motive force generated, because only a small part of the conductors constituting the coil, or more precisely only the current flowing through this small part of the coil, actually contributes to the generation of motive force. Also, with this construction, the cross-sectional area of the flux-conducting iron of the magnetic system of the motor must be rather large, because otherwise the flux-conducting iron will quickly saturate magnetically.

In another known construction of this type (disclosed in U.S. Pat. No. 3,899,699), a bar-shaped permanent magnet is mounted at the bottom and extends along the length of a channel formed by an elongated iron flux-return structure of U-shaped cross section. The elongated permanent magnet is magnetized in a direction perpendicular to its elongation and parallel to the two sides of the U of the channel. Arranged within the channel, and extending along its length, is a ferromagnetic rod surrounded by an energized cylindrical coil mounted on a longitudinally shiftable carriage the ferromagnetic material of which also serves as a flux-return structure for completing the magnetic circuitry of the magnetic system. Even with this construction, at most only one half of the energized coil participates electromagnetically in the generation of motive force. Furthermore, the flux of the magnetic system flows through the ferromagnetic material of the carriage on which the coil is mounted, so that this carriage must be sizable and heavy to carry the flux of the magnetic system of the motor.

SUMMARY OF THE INVENTION

It is a general object of the invention to provide a linear motor of the general type in question, but of a novel design such that a much greater fraction of the coil arrangement contributes to the generation of motive force, and furthermore such that the amount of iron needed for completion of the magnetic circuitry of the motor can be kept quite low.

These objects, and others described below, can be achieved by providing at the inner side of one of the two ferromagnetic bars a row of magnets, the row extending along the length of the bars. The magnets are magnetized in a direction perpendicular to the elongation of the bars, and successive ones of the magnets of the row are of alternate polarity. Two rows of such magnets can also be provided, each row provided at the inner side of a respective one of the two ferromagnetic bars. The winding of the motor armature comprises at least two coils arranged between the row of magnets and the opposite ferromagnetic bar, or between the two rows of magnets if two rows of magnets are utilized. The intercoil pitch relative to the spacing between adjoining magnets of the magnet row is so selected in dependence upon the number of energization-phases of the coils and the phase shifts as between the energizing currents for the coils, as to produce as steady as possible a motive force moving the coils along the lengths of the ferromagnetic bars. E.g., in the case of two coils energized by current of different respective phase, the intercoil pitch will be such that when one coil is in a region of low magnetic flux and therefore contributing little or nothing to motive force the other coil will be in a position developing sufficient motive force to continue the linear advancement of the coils.

Utilizing the inventive concept, a very large fraction of the total length of conductor constituting each coil — or more precisely the current flowing therein — contributes to the generation of motive force. The amount of electrical energy wasted per unit of motive force generated can be kept extremely low. Additionally, the amount of iron needed for the magnetic circuit of the motor can be kept comparatively low, because the flux-conducting iron does not tend to saturate to the extent occurring in prior-art constructions. Preferably, use is made of two rows of magnets, each extending along the inner side of a respective one of the two ferromagnetic bars, with oppositely polarized magnets in the two rows being located directly opposite to each other. The two ferromagnetic bars can be the legs of a one-piece ferromagnetic profile of U-shaped cross section. This U-shaped profile can simultaneously serve as a mechanical-load-bearing structural component of the motor and/or of the apparatus driven by the motor.

The magnets are preferably permanent magnets. The armature coils are preferably flat coils whose faces are oriented parallel to the general plane of movement of the coils.

The invention also contemplates commutation of the currents flowing through these coils in dependence upon the detected positions of the coils. The commutation system can include magnetic-field sensors mounted for movement along the length of the air gap between the magnet rows in synchronism with the armature coils. Alternatively, it is contemplated to control the commutation by means of optoelectronic detectors which sense coil position.

It is also contemplated to utilize the inventive linear motor as a servo motor. The coils of the linear motor can be energized by a negative-feedback position regulator, for example the regulator disclosed in commonly owned U.S. Pat. No. 4,042,863. In that event, the generation of feedback information concerning the instantaneous position of the coils is preferably performed optoelectronically. Advantageously, an optoelectronically sensed synchronizing structure, such as disclosed in that patent, can be provided in the form of an elongated strip located at the bottom and extending along the length of the U-shaped ferromagnetic structure.

If the motor is, for example, to be utilized to drive the printing head in a print-out device, then an important practical problem which arises is that of dust falling off the paper upon which the print-out device prints, and falling in particular upon the optoelectronic components of the position detector of the motor. To counteract this problem, the invention contemplates the use of a flexible dust shield of such a design that it does not interfere with the linear travel of the armature coils. The dust shield may be in the form of a web which travels with the armature coils. Alternatively, the dust shield may be stationary, but of self-healing design, so that the armature can travel through the dust shield without interference.

According to a particular concept of the invention, the coil arrangement is positively cooled. Advantageously, a blower is located in the space between the two ferromagnetic bars and produces a flow of cooling air. If positive cooling such as this is used in conjunction with the just mentioned dust shield, it additionally becomes possible to establish a greater than ambient pressure within the space enclosed by the dust shield; this makes it even more difficult for dust to penetrate through the dust shield into the space containing components to be protected from dust.

The U-shaped ferromagnetic profile can simultaneously serve as a mechanical-load-bearing component of the device driven by the motor, for example a data print-out apparatus.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
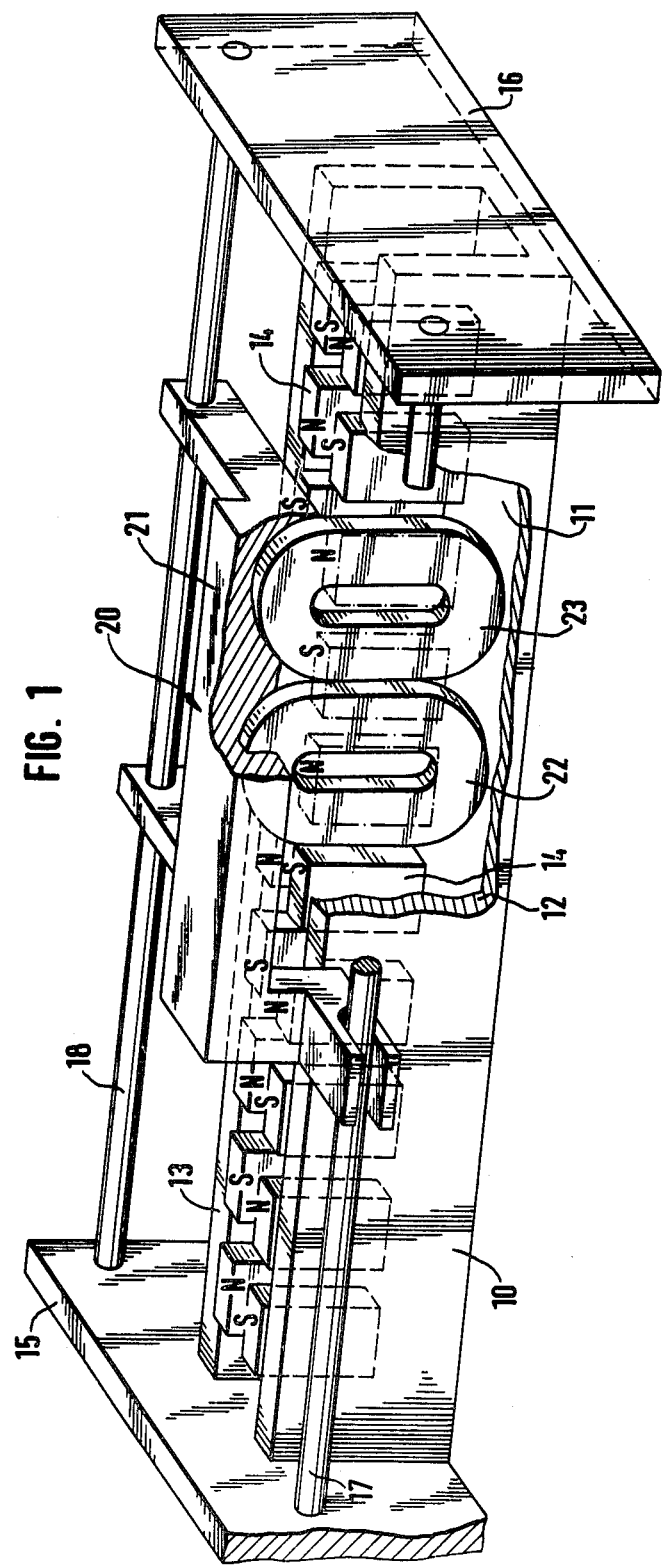
FIG. 1 is a cutaway perspective illustration of an exemplary embodiment of the inventive linear motor, utilizing two rows of magnets.
Figure 2:
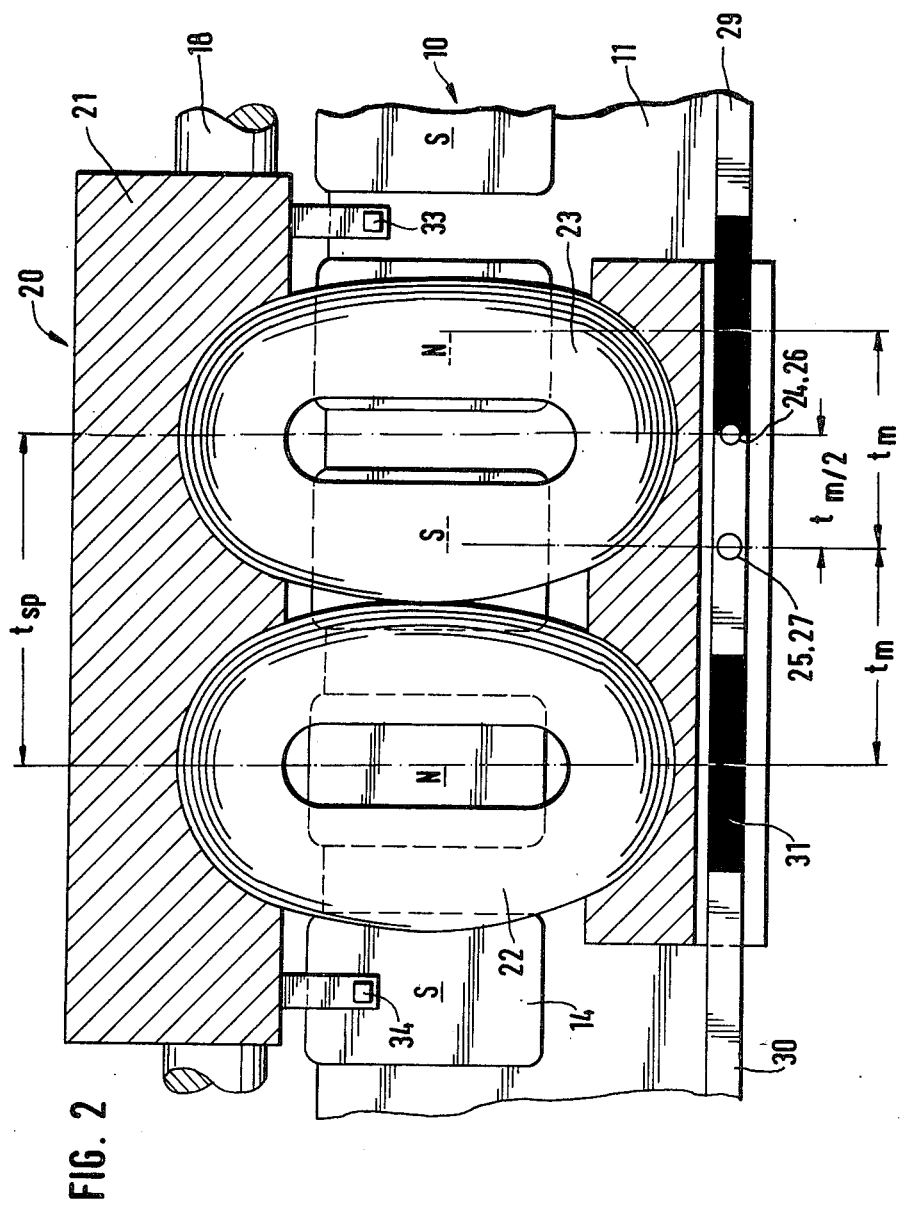
FIG. 2 is an enlarged-scale view of part of the structure shown in FIG. 1.

In FIG. 1, numeral 10 generally denotes the stator of the linear motor. The stator 10 comprises two ferromagnetic bars 12, 13, here constituted by the two upright legs of a U-shaped carrier structure 11. The inner side of each bar 12, 13 is provided with a respective row of permanent magnets 14. The magnets 14 are polarized in the direction in which the two bars 12, 13 are spaced apart, i.e., perpendicular to the elongation of the bars 12, 13. The magnets of each magnet row are of alternate polarity; if the inner face of one magnet in a magnet row constitutes a south pole, then the inner face of the next magnet in that row constitutes a north pole, and so forth. Corresponding magnets 14 in the two magnet rows are located directly opposite each other, and their facing pole faces are of opposite polarity, i.e., so that a south-pole pole faces directly opposite a north-pole pole face, and so on all along the magnet rows. The intermagnet spacing $t_m$ is indicated in FIG. 2. The ends of the U-shaped carrier 11 are closed off by end plates 15, 16, between which extend guide rails 17 and 18.

The armature 20 of the linear motor comprises a carriage 21 mounted for sliding movement on the guide rails 17, 18. Carriage 21 carries two depending flat armature coils 22, 23. The two armature coils 22, 23 are located one after the other in the direction of linear travel. They occupy the air gap between the two rows of magnets 14. Their broad faces are parallel to the general plane in which they move. The configuration of the flat coils 22, 23 is such that the lengths of the vertically extending stretches of their constituent conductors are equal to or greater than the vertical lengths of the permanent magnets 14. The intercoil pitch $t_{sp}$ is indicated in FIG 2. In the embodiment of FIGS. 1 and 2, the intercoil pitch $t_{sp}$ is equal to 150% of the intermagnet pitch $t_m$. In a manner described below, the respective currents flowing through the two coils 23, 24 are phase-shifted relative to each other by 90°.

Considering the position of the armature 20 depicted in FIG. 2, assume that the current in flat coil 23 is flowing clockwise; i.e., current flows upward along the left vertical stretches of the constituent conductor and flows downward along the right vertical stretches of the constituent conductor. In that situation, the electromagnetic field of flat coil 23 will be of polarity opposite to the polarity of the field between the two facing magnets 14 at the left of coil 23, and the resultant motive force will be leftward, attempting to move the field of coil 23 into coincidence with the field between the two facing magnets 14 at the left of the coil.

Each of the two coils 22, 23 is provided with a respective light source 24 or 25, and with a respective light detector 26 or 27. The two sensors 24, 26 and 25, 27 are mounted on the carriage 20 and accordingly share the movements of the coils. The light sources 24, 25 and the light detectors 26, 27 travel along the lengths of a commutation track 29. The commutation track 29 may for example be a stationary upright strip of material which runs along the length of the carrier 11. Commutation track 29 is comprised of alternate light and dark zones 30 and 31, each of whose length is equal to the intermagnet pitch $t_m$. The spacing between the two sensors 24, 26 and 25, 27 is equal to one half the intermagnet pitch $t_m$. The location of each of the two sensors, relative to its associated coil, is such that the sensor is located at the transition between a light zone 30 and a dark zone 31 when the associated coil is located centrally (not offset) relative to one pair of facing magnets 14; this is to be seen in FIG. 2 for the coil 22 and its associated sensor 24, 26.

Returning to the above discussed leftward motive force exerted on coil 23 in its illustrated position in FIG. 2, it will be noted that its sensor 25, 27 is located in the middle of a light zone 30. As the coil 23 moves leftward, its sensor 25, 27 will reach the right end of the adjoining dark zone 31. When this occurs, the sensor 25, 27 triggers a reversal of the direction of current flow within coil 23. The commutation of the current flowing through coil 22 is analogous. In the position of coil 22 shown in FIG. 2, its sensor 24, 26 has just reached the start of a light zone 30, and has just triggered a switchover from counterclockwise to clockwise current flow within the coil 22. With the intermagnet and intercoil pitches and offsets shown in FIG. 2, the phase shift between the currents energizing coils 22 and 23 will accordingly amount to 90°.

Instead of the commutation track 29 and the cooperating optoelectronic sensors, use can be made of magnetic-field sensors 33, 34, each associated with one of the two coils 22, 23. The location of each such sensor 33 or 34 relative to its associated coil is depicted in FIG. 2. When coil 22 is in the position shown in FIG. 2 (centrally located relative to a pair of facing magnets 14), its magnetic-field sensor 33 is located in the gap between two adjoining pairs of magnets 14, whereas the magnetic-field sensor 34 for coil 23 is centrally located relative to a pair of facing magnets 14.

Figure 3:
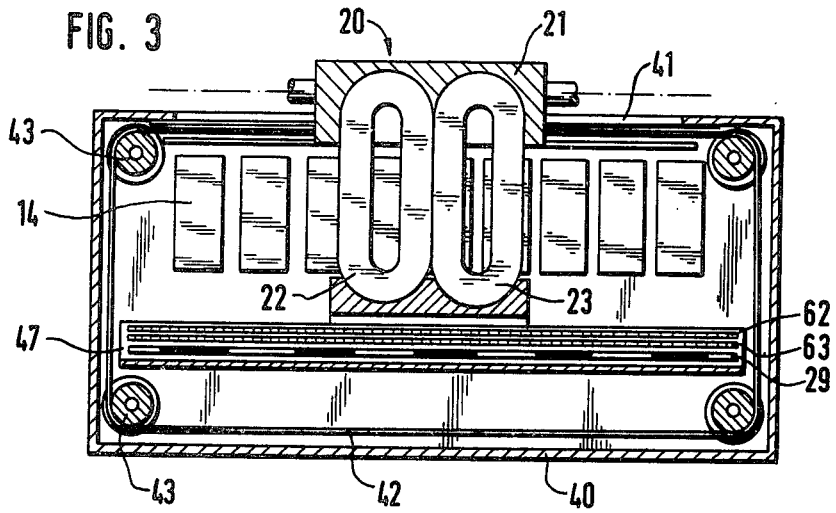
FIG. 3 is a longitudinal section through a modified version of the structure of FIG. 1, provided with a dust-shield system.
Figure 4:
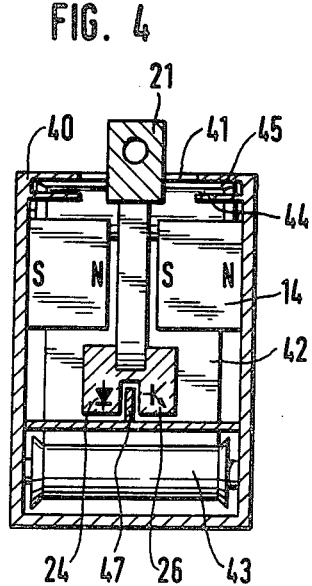
FIG. 4 is a transverse section through the structure depicted in FIG. 3.

FIGS. 3 and 4 depict a dust-shield system for linear motors of the type shown in FIGS. 1 and 2. For clarity, the guide structure for the armature 20 is omitted in FIGS. 3 and 4. The carrier structure 11 and the end plates 15, 16 are here replaced by a rectangular housing 40 which is closed at its four sides and base, and provided at its top with a longitudinal slot 41 within which the armature 20 can travel. To prevent the penetration of dust into the housing 40 through the longitudinal slot 41, the dust-shielding system of this embodiment includes a dust-shield band 42. Band 42 is trained about upper and lower guide rollers 43 located at the two ends of housing 40, and the band 42 is secured at its two ends to the carriage 21. The upper horizontal run of the dust-shield band 42 travels through a sealing gap 45 (see FIG. 4) provided in the upper wall of the housing 40 to either side of the longitudinal slot 41. The dust-shield band 42 travels with the armature 20 and, for all positions of the armature, completely closes off the longitudinal slot 41, preventing the entry of dust into housing 40.

In the embodiment of FIGS. 3 and 4, the commutation track 29 is provided in the form of an upright 47 extending lengthwise of the motor and mounted on the housing 40 beneath the coils 22, 23. The upright 47 can be constituted by alternate zones of transparent and non-transparent material, or be apertured. One of the two sensors 24, 26 is here schematically depicted as comprised of a light-emitting diode 24 and a phototransistor 26 located to opposite sides of the upright 47. The light source and light detector of the other sensor are likewise located to opposite sides of upright 47.

Instead of a dust-shield system comprising a dust-shield band 42 which travels with the armature 20, use could be made of two dust-shield strips located to close the whole length of longitudinal slot 41 with a self-healing or quasi-zipper action. The armature would pass along the length of the self-healing strips, between them, with the dust seal formed by the two cooperating strips continually being "healed" as the armature passes along its length. This alternative is not illustrated; it is known for other purposes, for example in U.S. Pat. No. 2,981,824 and in German published patent application DT-AS No. 2,121,406.

In FIGS. 3 and 4, a single dust-shield band 42 is connected at both its ends to the carriage 21, and travels down the sides and across the bottom of housing 40. Alternatively, use could be made of two such dust-shield bands. Each one would be connected to the carriage 21 at only one of its ends. Each would be connected at its other end to a respective spring-biased take-up spool mounted at one of the ends of the housing 40, each take-up spool being spring-biased so as to tend to collect the associated dust-shield band. Such an expedient is disclosed in FIG. 5 of German Pat. No. 1,269,750.

Figure 5:
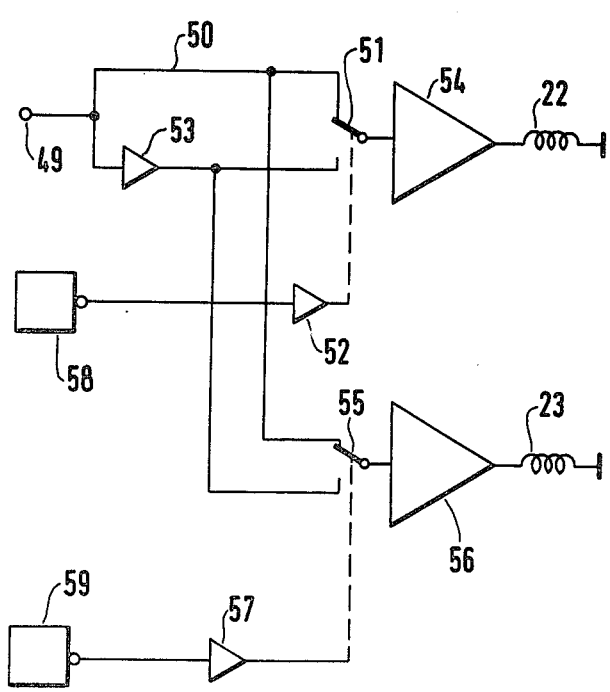
FIG. 5 is a simplified block diagram of an exemplary commutating circuit for the armature coils of the motor.

FIG. 5 depicts an exemplary embodiment of a commutation circuit for the coils 22, 23, which additionally makes it possible to operate the linear motor in the manner of a servomotor. A D.C. control voltage $U_R$ is applied to the input terminal 49 of the circuit; in a servo-system context, the magnitude and sign of this control voltage may for example correspond directly to that of a system error signal. Control voltage $U_R$ is directly transmitted via a line 50 to one input of an electronic changeover switch 51, whose state is controlled by an activating stage 52. The other input of changeover switch 51 receives the control voltage $U_R$ via an inverter 53. The output terminal of changeover switch 51 is connected to the input of a power amplifier 54 for coil 22. The line 50 and the output of inverter 53 are furthermore connected to respective inputs of a second electronic changeover switch 55, the output terminal of which is connected to the input of a power amplifier 56 for coil 23. The activating stage 52 which controls the state of changeover switch 55 is denoted by 57. The activating stages 52, 57 for the two changeover switches are connected to the outputs of two commutation units 58, 59, each associated with one of the two coils. The units 58, 59 can be the optoelectronic sensors 24, 26 and 25, 27 discussed above, or the magnetic-field sensors 33, 34 discussed above. It will be apparent that the illustrated circuit causes the linear motor to operate as a two-phase collectorless wound-armature D.C. motor. The electrical connections between the outputs of amplifiers 54, 56 and the two coils 22, 23 can be implemented using trailing cables.

If one wishes to utilize the disclosed linear motor as a positioning servomotor, or even as a stepper motor, it is merely necessary to utilize an appropriate control voltage for the energization of the two-phase-energized coils 22, 23. Preferably, the control voltage is generated by the means disclosed in commonly owned U.S. Pat. No. 4,042,863, the entire disclosure of which is herewith incorporated by reference. When the system of that patent is utilized, position-information tracks are needed to generate feedback information used for the generation of a control signal such as to cause the motor to operate as a stepper motor or as a position servomotor. To that end, the upright 47 in the structure of FIGS. 3 and 4 is provided not only with a commutation track 29, but additionally with position-information tracks 62, 63 bearing position information of the type disclosed in the aforementioned patent. It will be understood that these additional position-information tracks will be sensed by further sensors.

It is also contemplated to provide limit switches at the ends of the travel path of the armature, which are tripped to interrupt coil energization when the armature reaches the end of its travel and must reverse direction. However, mechanical limit switches could be replaced by other, for example optoelectronic means, to accomplish the same purpose.

As already indicated, it would be possible to utilize only a single row of magnets 14, for example located alongside ferromagnetic bar 12. In principle, electromagnets could be used instead of permanent magnets 14.

In the exemplary embodiment of FIGS. 1 and 2, two coils 22, 23 are used, each energized by current of a different respective phase, the phases differing by 90°. For the case where the phase of the energizing current of each coil differs from its neighbor by 90°, the intercoil spacing $t_{sp}$ can be generalized as follows:

$$t_{sp} = (1/p) \cdot t_m + nt_{m'}$$

wherein $t_{sp}$ = the intercoil pitch
$t_m$ = the intermagnet pitch
n = an arbitrary integer
p = the number of energizing-current phases. In the embodiment of FIGS. 1 and 2, p = 2, n − 1, and the intercoil pitch $t_{sp}$ is equal to 150% the intermagnet pitch $t_m$.

If the energizing-current phases utilized differ one from the next by an angle other than 90°, the intercoil pitch $t_{sp}$ should be selected correspondingly. In general, for a given number of successive coils, a given number of energization phases, a given phase-shift from one energization phase to the next, and a given intermagnet pitch $t_m$, the intercoil pitch $t_{sp}$ is preferably selected such that the individual instantaneous contributions of each coil to the total motive force developed supplement one another, i.e., that none of the individual contributions oppose any of the others. Preferably, e.g., for the sake of orderliness and compactness, the coils should be equidistantly spaced, but in principle this is of course not absolutely necessary.

As shown in FIG. 1, an axial blower 65 is mounted on the end plate 16 producing an air flow (arrows 66, 67) which passes lengthwise along the space intermediate the two rows of magnets 14. The air flow indicated by arrow 66 occurs at the bottom of the U-shaped carrier 11, whereas the air flow indicated by arrow 67 is established in the upper region of the carrier, by way of example. Use can be made of a second such blower at the other end plate 15, to make this air flow stronger if needed and to make the flow of air more uniform along the length of the U-shaped carrier.

In FIG. 4, it will be noted that the motor drives a printing device 68, the mounting plates (e.g., 69) of which are mounted on and secured to the U-shaped carrier housing 40. In the plate 69 there are indicated the bearings 70, 71, the paper spool 72, 73, which are formed by the paper web 74 which travels over a fixed or turnable steel counter roller 75. Mounted on the carriage 21 is a printer 76, fixedly secured thereto, controlled only by means of the line 77, and printing upon the paper web with its print head.

It will be understood that each of the elements described above, or two or more together, may also find a useful application in other types of constructions and circuits differing from the types described above.

While the invention has been illustrated and described as embodied in a particular type of linear motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a linear motor, in combination, a ferromagnetic structure including a pair of spaced parallel ferromagnetic bars; a row of magnets extending in the direction of the elongation of the bars and located at the inner side of one of the bars, the individual magnets of the row being magnetized in a direction transverse to the elongation of the bars, the successive magnets of the row being of alternate polarity; an armature and means mounting the armature for travel along the length of the two bars, the armature including a plurality of coils spaced one from the next in the direction of elongation of the bars and oriented to cut through the magnetic field lines of the magnets of the row of magnets in the space intermediate the two bars; and energizing means for energizing the armature coils periodically and in a cyclical sequence causing the armature to travel along the length of the two bars.

2. The motor defined in claim 1, further including a second row of magnets extending in the direction of the elongation of the bars and located at the inner side of the other of the bars, the magnets of the second row likewise being magnetized in a direction transverse to the elongation of the bars, corresponding magnets in the two rows being of opposite polarity and standing opposite to each other.

3. The motor defined in claim 1, the ferromagnetic structure comprising a one-piece ferromagnetic profile of U-shaped cross section, the two ferromagnetic bars being the legs of the U-shaped ferromagnetic profile.

4. The motor defined in claim 3, the U-shaped ferromagnetic profile being a mechanical-load-bearing structural component of the motor.

5. The motor defined in claim 1, the magnets being permanent magnets.

6. The motor defined in claim 1, the armature coils being generally flat coils, the generally flat armature coils being so oriented that they travel in a plane coincident with their general plane.

7. The motor defined in claim 1, the energizing means comprising commutating means operative for commutating the energizing currents in the individual coils in dependence upon the longitudinal position of the armature.

8. The motor defined in claim 7, the commutating means including magnetic-field sensing means mounted for synchronous movement with the armature and operative for determining the position of the armature indirectly by sensing the magnetic field emanating from the magnets of the row of magnets.

9. The motor defined in claim 7, the commutating means including optoelectronic means operative for determining the position of the armature.

10. The motor defined in claim 1, the energizing means comprising means causing the motor to operate as a servo motor.

11. The motor defined in claim 1, the energizing means comprising means causing the motor to operate as a positioning servo.

12. The motor defined in claim 11, the means causing the motor to operate as a positioning servo including optoelectronic means operative for generating feedback information concerning armature position.

13. The motor defined in claim 12, the optoelectronic means including an optoelectronically readable structure located between the two ferromagnetic bars at their bases and bearing armature-position information.

14. The motor defined in claim 1, furthermore including dust-excluding means comprising a flexible dust-shield structure operative for preventing entry of dust into the space within the motor intermediate the two ferromagnetic bars.

15. The motor defined in claim 14, the dust-shield structure comprising a flexible dust-shield band secured to and travelling with the armature.

16. The motor defined in claim 14, the dust-shield structure comprising stationary dust-shield bands together forming a self-healing dust seal along the length of which the armature can penetrate and travel.

17. The motor defined in claim 1, further including cooling means for cooling the armature coils.

18. The motor defined in claim 17, the cooling means including blower means operative for establishing a flow of cooling air in the space between the two ferromagnetic bars.

19. The motor defined in claim 1, furthermore including dust-excluding means closing the space intermediate the two ferromagnetic bars from entry by dust, and blower means operative for establishing a flow of cooling air in the space internal to the dust-excluding means and a superambient pressure further contributing to prevention of entry of ambient dust.

20. The motor defined in claim 3, the U-shaped ferromagnetic profile additionally serving to support the weight of an apparatus driven by the motor.

* * * * *